(12) United States Patent
Vandervort (10) Patent No.: US 9,053,502 B2
(45) Date of Patent: Jun. 9, 2015

(54) SYSTEM AND METHOD OF COMMUNICATING WITH DISTRIBUTED MARKETPLACES

(75) Inventor: David R. Vandervort, Walworth, NY (US)

(73) Assignee: Xerox Corporation, Norwalk, CT (US)

(*) Notice: Subject to any disclaimer, the term of this patent is extended or adjusted under 35 U.S.C. 154(b) by 667 days.

(21) Appl. No.: 13/085,037

(22) Filed: Apr. 12, 2011

(65) Prior Publication Data

US 2012/0265643 A1    Oct. 18, 2012

(51) Int. Cl.
G06Q 30/00    (2012.01)
G06Q 30/06    (2012.01)

(52) U.S. Cl.
CPC ..................................... *G06Q 30/06* (2013.01)

(58) Field of Classification Search
CPC   G06Q 30/06; G06Q 20/0855; G06Q 30/0623
USPC ................................................. 705/26.1, 27.1
See application file for complete search history.

(56) References Cited

U.S. PATENT DOCUMENTS

| | | | |
|---|---|---|---|
| 5,826,244 | A | 10/1998 | Huberman |
| 6,272,473 | B1 | 8/2001 | Sandholm |
| 6,292,830 | B1 | 9/2001 | Taylor et al. |
| 6,405,175 | B1 * | 6/2002 | Ng .............................. 705/14.26 |
| 6,647,373 | B1 | 11/2003 | Carlton-Foss |
| 6,952,678 | B2 | 10/2005 | Williams et al. |
| 7,200,570 | B1 | 4/2007 | Wu |
| 7,231,365 | B2 | 6/2007 | Kashima et al. |
| 7,272,579 | B1 | 9/2007 | Canali et al. |
| 7,587,341 | B2 | 9/2009 | Wagner et al. |
| 2001/0047311 | A1 | 11/2001 | Singh |
| 2003/0097296 | A1 | 5/2003 | Putt |
| 2003/0225677 | A1 | 12/2003 | Sandholm et al. |
| 2003/0225683 | A1 | 12/2003 | Hill et al. |
| 2004/0210490 | A1 | 10/2004 | Almstead et al. |
| 2004/0210510 | A1 | 10/2004 | Cullen et al. |
| 2005/0108036 | A1 | 5/2005 | Andreoli et al. |
| 2005/0108982 | A1 | 5/2005 | Formisano |
| 2006/0041503 | A1 | 2/2006 | Blair et al. |
| 2006/0149658 | A1 | 7/2006 | Smith |
| 2006/0173775 | A1 | 8/2006 | Cullen et al. |
| 2007/0016514 | A1 | 1/2007 | Al-Abdulqader et al. |
| 2007/0073723 | A1 | 3/2007 | Ramer et al. |
| 2007/0192201 | A1 | 8/2007 | Nalik |
| 2008/0103958 | A1 | 5/2008 | Walker |
| 2008/0114661 | A1 | 5/2008 | Byde et al. |

OTHER PUBLICATIONS

"Tejari Introduces Next Generation of E-Commerce with major upgrade to its trading technology" (Al Bawaba. London: Nov. 19, 2006. p. 1).

* cited by examiner

*Primary Examiner* — Courtney Stopp
(74) *Attorney, Agent, or Firm* — Fox Rothschild LLP (57) ABSTRACT

A method of processing a specification may include receiving, by a home site, information regarding a search for at least one good or service, automatically generating, by the home site, a specification comprising a command block, an origin block and a routing block, based on the received information, and transmitting, by the home site, the specification to the one or more destination marketplaces. One or more of the command block, the origin block and the routing block may include one or more domain-specific language instructions. The command block may include one or more instructions defining the search and one or more instructions defining one or more actions to perform with respect to results of the search. The origin block may include information identifying the home site. The routing block comprises information identifying one or more destination marketplaces.

18 Claims, 6 Drawing Sheets

175 ↘

```
origin:                                              115
    home: http://someprojectmarketplace.com ⟋
    verification: http://someprojectmarketplace.com/verify —125
    uuid: fa6c9a06-a197-102d-bcdf-000c29d8a63d —130
    user_id: 102dbcdf000c29d8a63d ————120
    created_time: Sun Apr 25 04:52:50 EDT 2010 —135
```
110 ⟵

```
routing:
    visited: http://someothermarket.com/verify —140a
    when: Monday Apr 26 11:02:32 EDT 2010 —145a
    verified: nil —150a
    visited: http://someprojectsite.com/verify —140b
    when: Tuesday Apr 27 19:21:04 EDT 2010 —145b
    verified: true —150b
    time_to_live: 4 hops —160
    destination: http://projectsrus.com —165
    match_site_type: freelance, project —170
```
155 ⟵ signature: 46fea4becbbdc7b3d66022022c521e399a91192b

```
specification:
    search:
        keywords: java, .net, ajax
        duration: 2 weeks+
    action:
        email:
            to: useralpha@amicrowork.com
            subject: You might want to bid on these projects
            include: top 10
```
100 ⟵                                                    —105

```
origin:
    home: http://www.homesite.com
    verification: http://www.homesite.com/verify
    uuid: hr4a7b80-w156-231c-rlt-000c18e6b23e
    user_id: 231c-rlt-000c18e6b23e
    created_time: Wed Sept 1 03:32:10 EDT 2010 routing:
    destination: http://carworld.com
    match_site_type: cars, automobiles signature: 23aef2ecbbcd8b2c32213798a312c277b6233b specification:
    search:
        item: car, automobile
        model: Honda
        make: Civic
        color: black
        year: 2000-2008
        duration: 2 sites
    action:
        email:
            to: user@address.com
            subject: Honda Civics for Sale
            include: top 10
```

*FIG. 4A* origin:
    home: http://www.homesite.com
    verification: http://www.homesite.com/verify
    uuid: hr4a7b80-w156-231c-rlt-000c18e6b23e
    user_id: 231c-rlt-000c18e6b23e
    created_time: Wed Sept 1 15:32:10 EDT 2010 routing:
    visited: http://www.carworld.com ⎯⎯ 400
    when: Thu Sept 2 09:02:34 EDT 2010 ⎯⎯ 405
    verified: true ⎯⎯ 410
    destination: http://www.carforsale.com ⎯⎯ 415
    match_site_type: cars, automobiles signature: 23aef2ecbbcd8b2c32213798a312c277b6233b specification:
    search:
        item: car, automobile
        model: Honda
        make: Civic
        color: black
        year: 2000-2008
        duration: 2 sites     action:
        email:
            to: user@address.com
            subject: Honda Civics for Sale
            include: top 10

SYSTEM AND METHOD OF COMMUNICATING WITH DISTRIBUTED MARKETPLACES

BACKGROUND

The Internet facilitates the sale of goods or services by many different vendors. To purchase goods or services, a consumer often must create an account on many different market sites, and log into each one to peruse the goods and services offered. This approach is time intensive, and it limits the number of markets with which a consumer can interact. As an alternative strategy, a consumer may rely on a service that aggregates sale information from a variety of market sites. This approach is still time intensive, as a search can return thousands of listings and a consumer must examine each to determine whether the goods or services meet the consumer's specifications.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of processing a specification may include receiving, by a home site, information regarding a search for at least one good or service, automatically generating, by the home site, a specification comprising a command block, an origin block and a routing block, based on the received information, and transmitting, by the home site, the specification to the one or more destination marketplaces. One or more of the command block, the origin block and the routing block may include one or more domain-specific language instructions. The command block may include one or more instructions defining the search and one or more instructions defining one or more actions to perform with respect to results of the search. The origin block may include information identifying the home site. The routing block comprises information identifying one or more destination marketplaces.

In an embodiment, a system for processing a specification may include a computing device and a computer-readable storage medium in communication with the computing device. The computer-readable storage medium may include one or more programming instructions for receiving information regarding a search of at least one good or service, using the received information to automatically generate a specification comprising a command block, an origin block and a routing block, and transmitting the specification to the one or more destination marketplaces. One or more of the command block, the origin block and the routing block may include one or more domain-specific language instructions. The command block may include one or more instructions defining the search and one or more instructions defining one or more actions to perform with respect to results of the search. The origin block may include information identifying the home site. The routing block may include information identifying one or more destination marketplaces.

In an embodiment, a method of processing a specification may include receiving, by a first destination marketplace, a specification from a home site. The specification may include a command block, an origin block and a routing block. The command block may include one or more instructions for performing a search and one or more search criteria. the method may include authenticating, by the first destination marketplace, the specification by transmitting a digital signature identified in the specification to a website corresponding to a verification uniform resource locator identified in the specification, and in response to receiving verification of authenticity from the website, processing, by the first destination marketplace, the specification. The method may include creating, by the first destination marketplace, an updated specification by modifying the specification to reflect the processing and performing, by the first destination marketplace, one or more actions based on the updated specification.

In an embodiment, a method of processing a specification may include receiving, by a first destination marketplace, a specification from a home site. The specification may include a command block, an origin block and a routing block. The command block may include one or more instructions for performing a search, one or more search criteria and a marketplace type. The method may include authenticating, by the first destination marketplace, the specification by transmitting a digital signature identified in the specification to a website corresponding to a verification uniform resource locator identified in the specification, and in response to receiving verification of authenticity from the website, determining whether the first destination marketplace satisfies the marketplace type. The method may include in response to the first destination marketplace satisfying the marketplace type, processing, by the first destination marketplace, the specification, creating, by the first destination marketplace, an updated specification by modifying the specification to reflect the processing, and incrementing, by the first destination marketplace, a transmission number of the specification. The transmission number may indicate a number of times the specification has been transmitted. The method may include in response to a permitted transmission number exceeding the incremented transmission number, transmitting, by the first destination marketplace, the specification to a second destination marketplace. The permitted transmission number may indicate a number of times the specification is allowed to be transmitted.

In an embodiment, a system for processing a specification may include a computing device associated with a first marketplace destination and a computer-readable storage medium in communication with the computing device. The computer-readable storage medium may include one or more programming instructions that, when executed, cause the computing device to perform receiving a specification from a home site, authenticating the specification by transmitting a digital signature identified in the specification to a website corresponding to a verification uniform resource locator identified in the specification, in response to receiving verification of authenticity from the website, processing the specification, creating an updated specification by modifying the specification to reflect the processing, and performing one or more actions based on the updated specification. The specification may include a command block, an origin block and a routing block. The command block may include one or more instructions for performing a search and one or more search criteria.

DETAILED DESCRIPTION

The following terms shall have, for purposes of this application, the respective meanings set forth below:

A "marketplace" is a web page, a website and/or other e-commerce application that sells and/or offers for sale goods and/or services.

A "home site" is a website or other application that generates and/or transmits a specification on behalf of a user. In an embodiment, a user may provide information to a home site regarding a search to be performed, an action to take and/or the like.

A "destination marketplace" is a marketplace that receives a specification for processing.

A "specification" is an electronic file or other data structure that defines a product and/or service that is being sought and one or more instructions that, when executed, perform one or more actions in response to locating the product and/or service.

"Processing" means executing one or more instructions of a specification. For example, a marketplace may process a specification by performing a search of a database or other storage medium associated with the marketplace that is defined in the specification.

A "command block" may be one or more instructions that define an action to perform. For example, a command block may include one or more instructions for performing a search of a marketplace.

An "origin block" is one or more pieces of information identifying and/or corresponding to a home site, a user and/or the like. For example, an origin block may include a URL identifying a home site.

A "routing block" is one or more instructions for transmitting a specification to a destination marketplace. In an embodiment, a routing block may include one or more instructions for a destination marketplace to use to forward the specification to one or more other marketplaces.

The Internet offers consumers a variety of different marketplaces. In an embodiment, individual marketplaces may be considered as a single Internet marketplace with highly distributed components. The components may appear incompatible because of differing arrangements and implementations; however, the components may have similar functions relating to a buying and selling model. For example, each component may allow a consumer to search for an item, purchase an item, bid on a good and/or a service, and/or the like. Table 1 illustrates a comparison of exemplary characteristics of an auction site, a retail site and a project site according to an embodiment.

TABLE 1

| Action | Auction Site | Retail Site | Project Site |
| --- | --- | --- | --- |
| Search postings | X | X | X |
| Create postings | X | | X |
| Place bid/purchase | X | X | X |
| Accept bid | X | | X |
| Reject bid | X | | X |
| Watch price | X | X | |

Because different marketplaces operate similarly, a single specification may be generated by a user and may be executed by many marketplaces without modification. In an embodiment, a specification may be generated using a domain-specific language (DSL). A DSL is a programming construct that uses natural language words, phrases and/or portions thereof to describe one or more actions a program should perform. In an embodiment, the words that are used in a DSL may directly correspond to program methods, which may make implementing an interpreter that can parse the DSL and execute commands relatively straight-forward.

Figure 1:
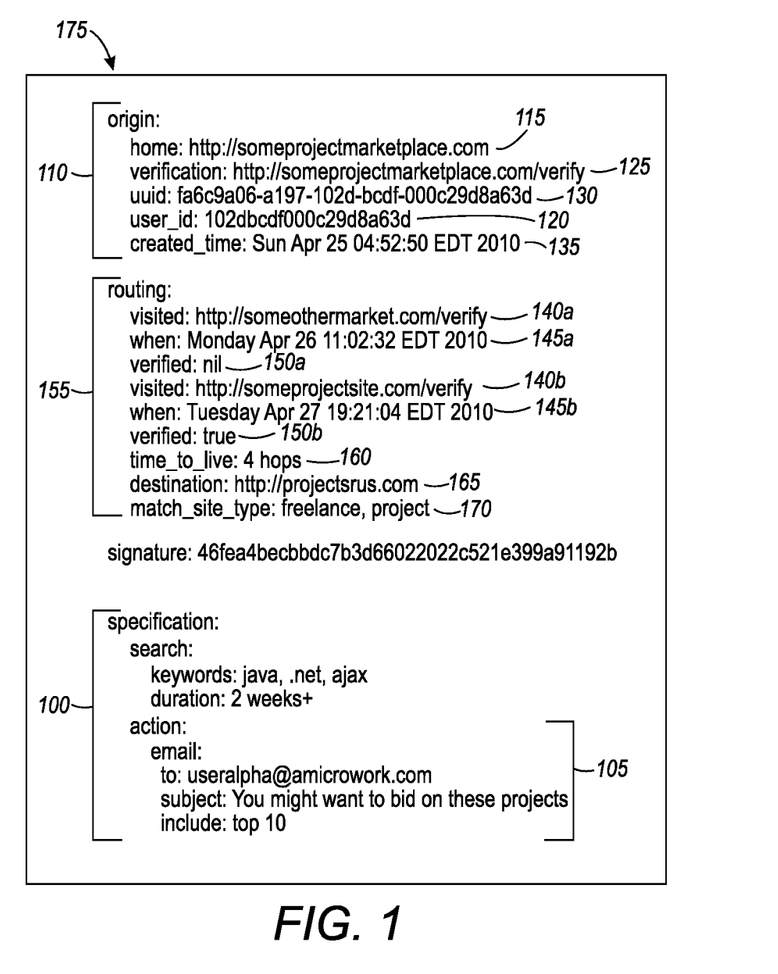
FIG. 1 illustrates an exemplary specification according to an embodiment.

FIG. 1 illustrates an exemplary specification 175 according to an embodiment. As illustrated by FIG. 1, a specification 175 may include one or more command blocks 100. In an embodiment, a DSL may be used to define one or more command blocks of a specification. In an embodiment, a command block may include one or more key-value pairs. A key may be an instruction drawn from the DSL. A value may be a parameter of the instruction. For instance, an exemplary instruction may be "ftp_to:", and an exemplary value may be "ftp.somesite.com." A command block having this key-value pair may instruct an interpreter to send a file to the destination represented by "ftp.somesite.com" using the FTP protocol.

In an embodiment, a command block may include one or more instructions for logging into a user account, performing a search and/or the like. In an embodiment, a command block for performing a search may include a search term identifying the good(s) and/or service(s) that are being sought. In an embodiment, a command block for performing a search may include a minimum price, a maximum price, product information, such as make, model, color and/or the like. For example, FIG. 1 illustrates a command block 100 that may be used to search projects described using "java", ".net" or "ajax." As another example, the following command block may be used to search a retail site for vacuum cleaners under $500 from any manufacturer:

Search:
Item: vacuum cleaner
Price: <500
Make: any

In an embodiment, a specification having a command block for performing a search may include one or more instructions for performing one or more actions on one or more results of the search. Exemplary actions may include refining the search, placing a bid on a good and/or a service, purchasing a good and/or a service, emailing the results to a user and/or the like. For example, FIG. 1 illustrates exemplary instructions 105 for emailing a user the top ten results of the search. As illustrated by FIG. 1, an email including the top ten results may be sent to the email address useralpha@amicrowork.com with the subject line "You might want to bid on these projects." These instructions may send only the first ten items in the search results to the specified email address using the given subject line. Additional and/or alternate instructions may be used within the scope of this disclosure.

In an embodiment, a specification may include an origin block. An origin block may include information about a home site, a user and/or the like. In an embodiment, an origin block may be used to validate the existence of a user, and facilitate the transfer of information back to the home site.

In an embodiment, an origin block may include an identifier of the home site, such as a uniform resource locator (URL) and/or the like. For example, referring to FIG. 1, the origin block 110 includes a URL 115 identifying the home site. The origin block may include a user identifier that uniquely identifies the user. In an embodiment, a user identifier may be a session code, which may help prevent spoofing of identifiable user information, such as a user name, an account number and/or the like. In an embodiment, a user identifier may be encrypted so that it can only be interpreted by the home site. FIG. 1 illustrates an exemplary user identifier 120 according to an embodiment.

In an embodiment, an origin block may include a verification URL. A verification URL may be a URL that a destination marketplace can use to request verification from a home site that sent the specification. FIG. 1 illustrates an exemplary verification URL 125 according to an embodiment. In an embodiment, a specification may include a digital signature that may be used to perform verification. For example, a marketplace that receives a specification may transmit the digital signature that is embedded in the specification to the site associated with the verification URL. In response, the destination marketplace that received the specification may receive a verification of authenticity or a denial of authenticity from the home site. In an embodiment, a third party may perform the verification process. In an embodiment, if a verification of authenticity is received, the specification may be processed. If a denial of authenticity is received, the specification may not be processed.

In an embodiment, an origin block may include a Universal Unique Identifier (UUID). A UUID may be a unique identifier associated with a specification. FIG. 1 illustrates an exemplary UUID 130 according to an embodiment. A UUID may prevent a destination marketplace from executing multiple copies of the same specification. Since all copies of a specification may have the same UUID, a destination marketplace that receives multiple copies of a specification may be able to ignore all but the first copy that is received. In an embodiment, a UUID may allow a database of specifications, such as a database associated with a home site or another marketplace, to verify the source of the specification without the risk of naming collisions. In an embodiment, an origin command block may include a timestamp indicating the time at which the corresponding specification was created. In an embodiment, a timestamp may include a date, a time, a time zone and/or the like. FIG. 1 illustrates an exemplary timestamp 135 according to an embodiment.

In an embodiment, a specification may include a routing block. In an embodiment, a destination marketplace may have an associated database or other storage medium that stores names, descriptions, URL addresses and/or the like associated with the other marketplaces. A marketplace may forward the received specification to one or more of these marketplaces according to one or more instructions included in the routing block.

FIG. 1 illustrates an exemplary routing block 155 according to an embodiment. As illustrated by FIG. 1, a routing block 155 may include information about one or more marketplaces that have already received and processed the specification. In an embodiment, a routing block may include a URL or other identifier 140a-N of one or more visited marketplaces. A visited marketplace may be a marketplace that has already received the specification. In an embodiment, a routing block may include a timestamp 145a-N indicating the date, time and/or the like of when the specification was received by each visited marketplace. For example, referring to FIG. 1, the specification visited the marketplace http://someothermarket.com/verify on Monday, Apr. 26, 2010 at 11:02:32 EDT. In an embodiment, a routing block may include an indication 150a-N of whether each visited marketplace verified the specification.

As illustrated by FIG. 1, a routing block may include an indication 160 of how long or to how many marketplaces the specification is to be forwarded. For example, an indication may be an amount of time during which a specification should be forwarded, such as one day, one week, one month and/or the like. Additional and/or alternate amounts of time may be used within the scope of this disclosure. After the time period has ended, the specification may not be further forwarded.

In an embodiment, an indication 160 may be a number of times the specification should be forwarded. For example, referring to FIG. 1, the routing block 155 includes an indication 160 that the specification 175 should be forwarded four times. After the specification 175 has been transmitted four times, it may not be forwarded again.

In an embodiment, a routing block may include an indication of a destination marketplace to which the specification should be forwarded. The indication of a destination marketplace may be a name, URL and/or the like associated with the destination marketplace. As illustrated by FIG. 1, the specification 175 is to be forwarded to the marketplace identified by the URL http://projectsrus.com 165.

In an embodiment, a routing block may include an indication of a marketplace type. A marketplace type may be a category associated with a marketplace, a description of the goods and/or services offered by a marketplace, a purpose associated with a marketplace and/or the like. In an embodiment, an indication of a marketplace type may indicate the type of marketplace that should process the specification. For example, FIG. 1 illustrates a marketplace type 170 of "freelance" and "project." In an embodiment, if a specification is forwarded to a marketplace that does not satisfy the marketplace type, the marketplace may not process the specification. In an embodiment, if the marketplace does satisfy the marketplace type, the marketplace may process the specification.

Figure 2:
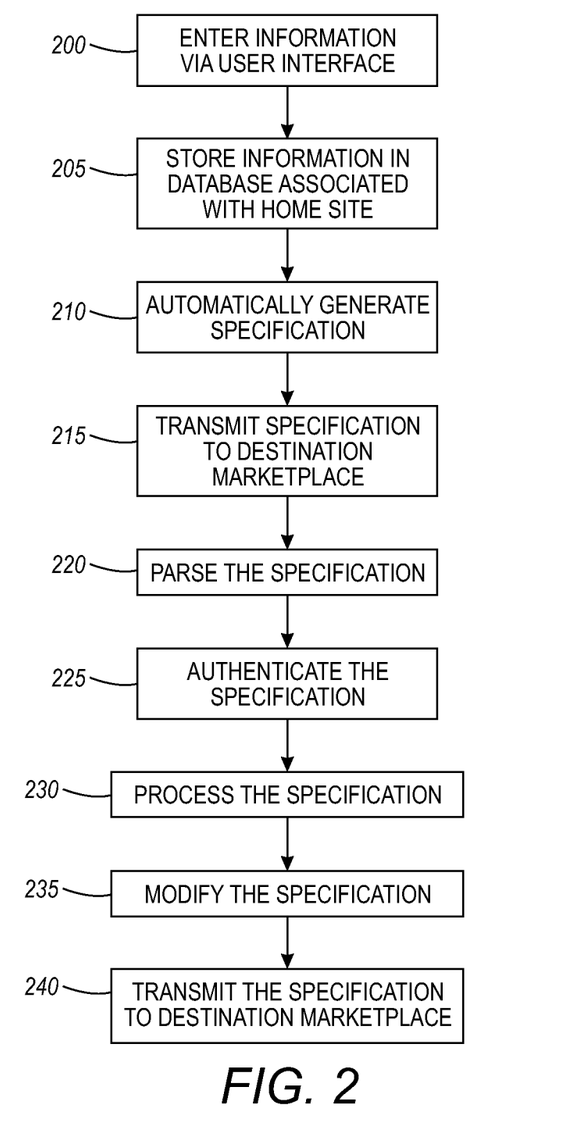
FIG. 2 illustrates an exemplary method of processing a specification according to an embodiment.
Figure 3:
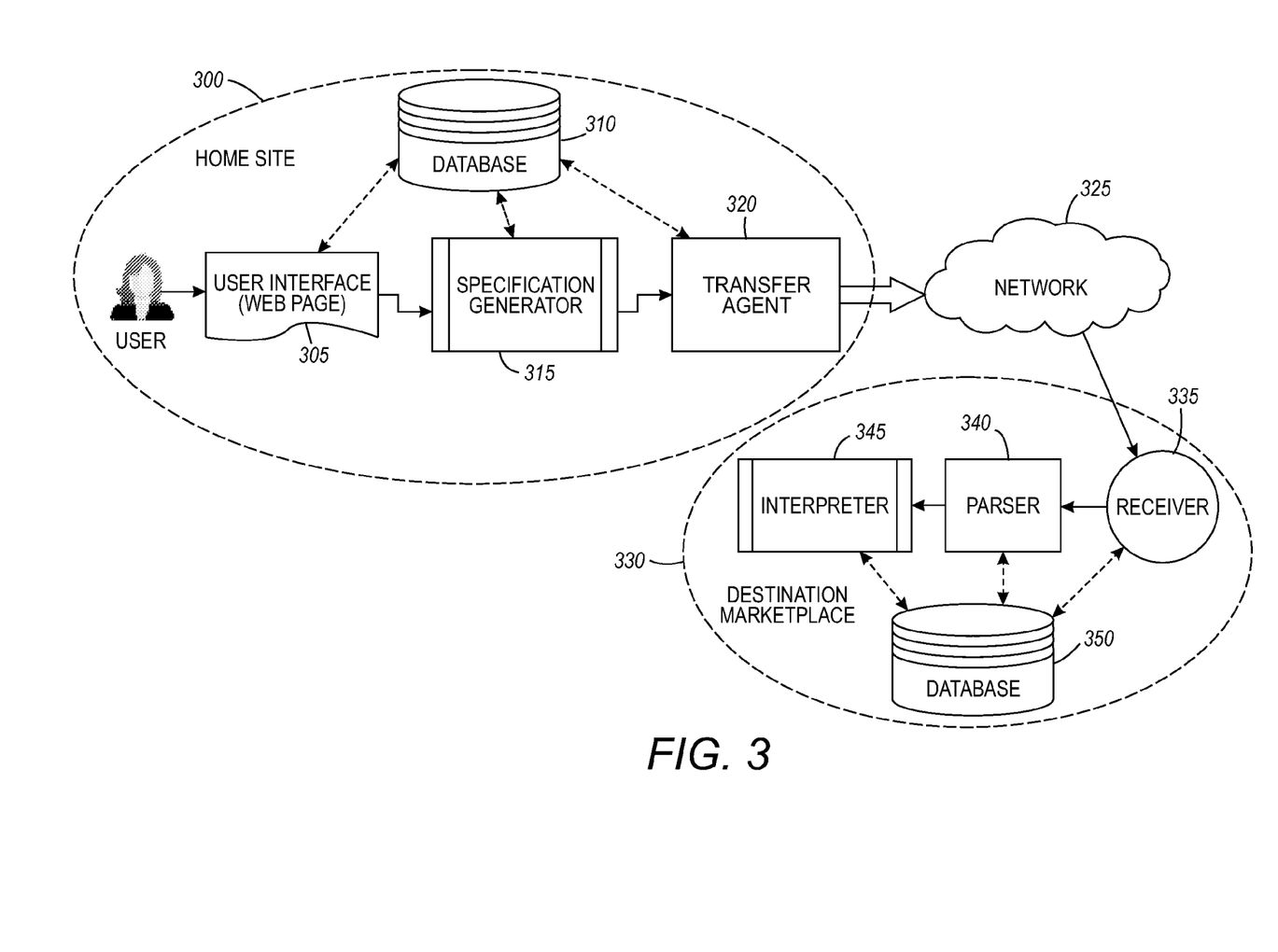
FIG. 3 illustrates an exemplary system for processing a specification according to an embodiment.

FIG. 2 illustrates an exemplary method of processing a specification according to an embodiment. FIG. 3 illustrates an exemplary system for processing a specification according to an embodiment. As illustrated by FIG. 3, a home site 300 may include a user interface 305, a database 310, a specification generator 315 and/or a transfer agent 320. In an embodiment, the database 310 may be in communication with the user interface 305, the specification generator 315 and/or the transfer agent 320.

In an embodiment, a user may enter 200 information via a user interface 305. In an embodiment, the user interface 305 may be provided as a webpage or other graphical user interface on a computing device. In an embodiment, a user may enter 200 information regarding a search to be performed. For example, a user may enter 200 information about the good(s) and/or service(s) to search for such as a description, a quantity, a color, a model, a make, a geographic region, a price and/or the like. Additional and/or alternate information may be used within the scope of this disclosure.

In an embodiment, a user may enter 200 information regarding one or more actions to take on the results of the search. In an embodiment, a user may enter 200 information regarding a destination marketplace. For example, a user may identify a marketplace by name, URL address, category of goods and/or services offered, purpose of the marketplace and/or the like. In an embodiment, a user may enter 200 information using one or more drop-down menus, radio buttons, checkboxes, free-form text entry fields and/or the like. Additional and/or alternate menus and/or fields may be used within the scope of this disclosure.

In an embodiment, the information that a user enters may be stored 205 in the database 310 associated with the home site 300. The entered information may be used by the specification generator 315 to create a specification. In an embodiment, a specification generator 315 may be a self-contained component of the home site 300. A specification generator 315 may include hardware, software and/or a combination of hardware and software. In an embodiment, a specification generator 315 may receive information provided by a user from the user interface 305 and/or a database 310. The specification generator 315 may use this information to automatically generate 210 a specification having an origin block, a command block, a routing block and/or the like.

For example, a user may want to search for a car. The user may specify that the car should be a black, 2000-2008 Honda Civic. The user may specify that the website http://www.carworld.com should be searched, and that the life of the search should be two marketplaces. The user may indicate that the top ten results from each marketplace should be emailed to his personal email account with the subject line "Honda Civics for Sale." In an embodiment, the specification generator 315 may use this information to generate 210 the specification shown in FIG. 4A.

In an embodiment, a user may specify that the specification should be transmitted to a certain marketplace. The specification may include an indication of this marketplace, such as a corresponding URL address. In an embodiment, a user may not specify a marketplace. In this case, the specification generator 315 may access information regarding one or more marketplaces from the database 310. In an embodiment, the database 310 may store information regarding one or more marketplaces with which the home site 300 is in communication. These marketplaces may include marketplaces that have been previously sent specifications, marketplaces affiliated with the home site, popular marketplaces and/or the like. The specification generator 315 may include an indication, such as a URL address, corresponding to one or more of the marketplaces from the database 310 in the specification.

In an embodiment, the transfer agent 320 may receive a specification from the specification generator. The transfer agent 320 may be a self-contained component of the home site. A transfer agent 320 may include hardware, software and/or a combination of hardware and software. In an embodiment, the transfer agent 320 may transmit 215 the specification to one or more marketplaces via a network 325, such as the Internet. In an embodiment, the transfer agent 320 may transmit 215 the specification to one or more destination marketplaces 330 that are identified in the specification.

In an embodiment, a destination marketplace 330 may receive the specification from the home site 300. In an embodiment, a receiver 335 associated with the destination marketplace 330 may receive the specification. If the specification is encrypted, the receiver 335 may decrypt the specification. A receiver 335 may be a self-contained component of a destination marketplace 330. A receiver 335 may include hardware, software and/or a combination of hardware and software.

In an embodiment, the receiver 335 may transmit the received specification to a parser 340 associated with the destination marketplace 330. A parser 340 may be a self-contained component of a destination marketplace 330. A parser 340 may include hardware, software and/or a combination of hardware and software. A parser 340 may parse 220 the text of the specification to identify program elements and confirm that the elements are expressed in the correct syntax.

In an embodiment, the parser 340 may transmit a specification that has been parsed to an interpreter 345 associated with a destination marketplace 330. An interpreter 345 may be a self-contained component of a destination marketplace 330. An interpreter 345 may include hardware, software and/or a combination of hardware and software. In an embodiment, an interpreter 345 may read the instructions contained in a specification, and may execute the instructions. For example, the specification identified in FIG. 4A may be sent to the destination marketplace 330 associated with the URL http://www.carworld.com. The specification may be received by a receiver 335 associated with the destination marketplace 330, and it may be transmitted to a parser 340 associated with the destination marketplace 330. The parser 340 may parse 220 the specification, and transmit it to an interpreter 345 associated with the destination marketplace 330.

In an embodiment, an interpreter 345 associated with a destination marketplace 330 may authenticate 225 a received specification. In an embodiment, the interpreter 345 may send the digital signature included in the received specification to the verification URL included in the specification. In response, the destination marketplace 330 may receive a verification of authenticity or a denial of authenticity from the home site 300. In an embodiment, if a verification of authenticity is received, the specification may be processed. If a denial of authenticity is received, the specification may not be processed.

In an embodiment, the interpreter 345 associated with a destination marketplace 330 may determine whether the destination marketplace satisfies one or more requirements of the specification. For example, as discussed above, a specification may include a marketplace type. The interpreter 345 may determine whether the destination marketplace satisfies the marketplace type. For example, if a marketplace type associated with a specification is "automobiles," but the destination marketplace includes a listing of available technology jobs, then the destination marketplace may not satisfy the marketplace type. In an embodiment, if the destination marketplace satisfies the marketplace type, the specification may be processed by the destination marketplace. Conversely, if the destination site does not satisfy the marketplace type, the specification may not be processed by the destination marketplace.

In an embodiment, the interpreter 345 may process 230 the specification. For example, the interpreter 345 associated with the URL address http://www.carworld.com may search its inventory for black, 2000-2008 Honda Civics. In an embodiment, the interpreter 345 may perform the one or more actions identified in the specification. For example, the interpreter 345 associated with the URL address http://www.carworld.com may send an email with a subject line "Honda Civics for Sale" to the address user@address.com. The content of the email may be the top ten search results from the search of the destination marketplace associated with the URL http://www.carworld.com.

In an embodiment, the interpreter 345 associated with a destination marketplace 330 may modify 235 the specification. For example, the interpreter 345 may update the routing block. The interpreter 345 may modify 235 the specification to indicate that the associated destination marketplace 330 has already processed the specification. In an embodiment, the interpreter 345 may modify 235 the specification to identify whether the specification was verified.

Figure 4A:
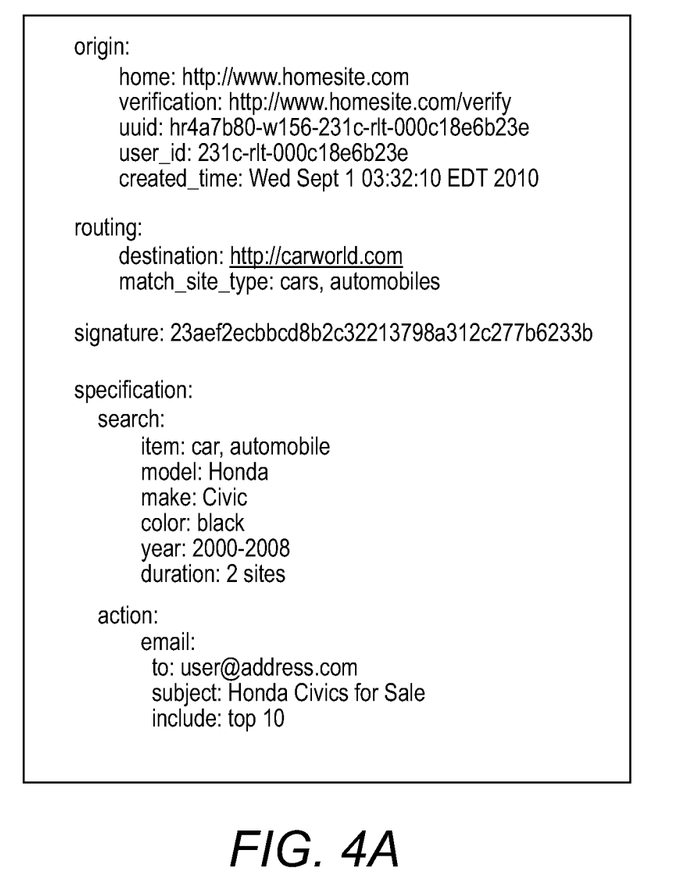
FIGS. 4A and 4B illustrate alternate exemplary specifications according to an embodiment.
Figure 4B:
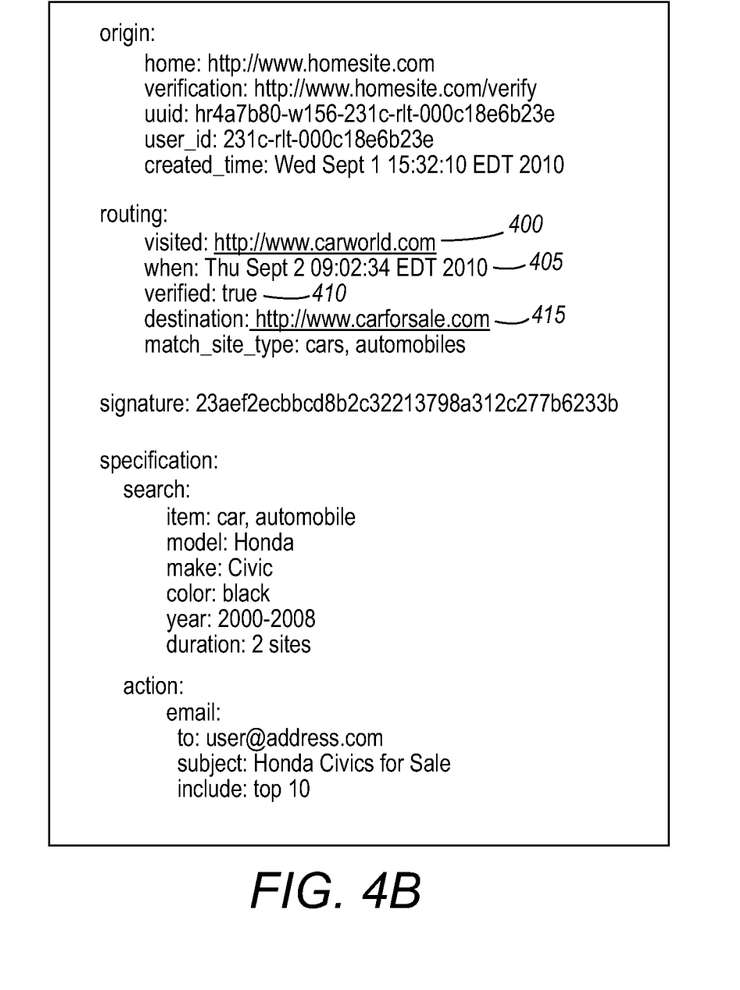

For example, FIG. 4B illustrates how the interpreter 345 associated with the destination marketplace http://www.carworld.com may modify 235 the specification shown in FIG. 4A. As illustrated by FIG. 4B, the routing block may be modified to provide an indication 400 that the destination marketplace associated with URL address http://www.carworld.com has already processed the specification. The routing block may be modified to include a timestamp 405 indicating when the destination marketplace was visited, and an indication 410 as to whether the destination marketplace was able to authenticate the specification. In an embodiment, the interpreter 345 may modify 235 the routing block of the specification to include a new destination marketplace 415. In an embodiment, the interpreter 345 may transmit 240 the specification to one or more destination marketplaces that are stored in the database 350 associated with the destination marketplace 330. For example, the database 350 associated with the destination marketplace 330 may store information regarding one or more other destination marketplaces with which the destination marketplace is in communication. These destination marketplaces may include destination marketplaces that have been previously sent specifications, destination marketplaces affiliated with the destination marketplace, popular destination marketplaces and/or the like.

In an embodiment, a marketplace may include a home site and a destination marketplace. In an embodiment, the home site of a marketplace may generate a specification, and the destination marketplace of the marketplace may process the specification. In an alternate embodiment, a home site may be associated with a different marketplace than a destination marketplace.

Figure 5:
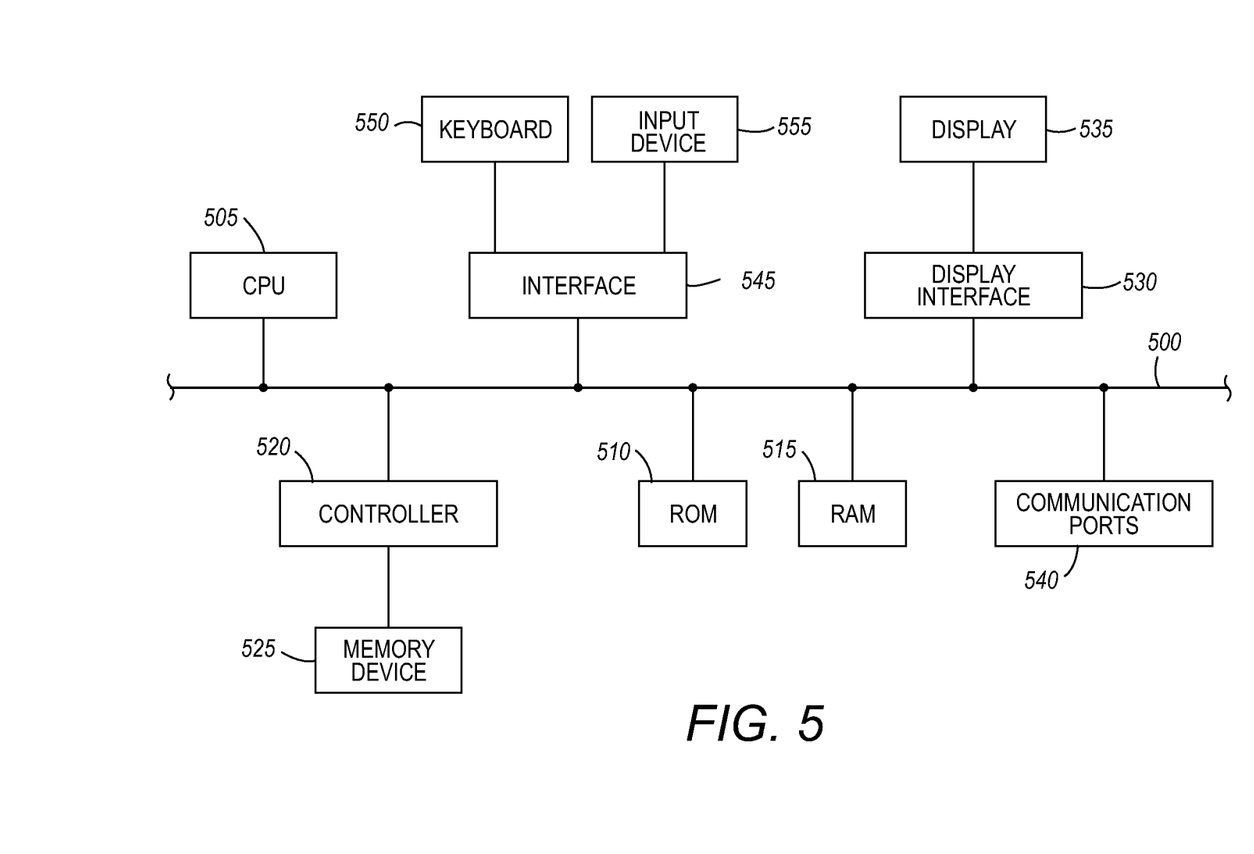
FIG. 5 illustrates a block diagram of exemplary internal hardware that may be used to contain or implement program instructions according to an embodiment.

FIG. 5 depicts a block diagram of exemplary internal hardware that may be used to contain or implement program instructions, such as the process steps discussed above in reference to FIG. 2, according to an embodiment. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 6, is an exemplary processing device, computing device or processor as such terms are used within this disclosure. Read only memory (ROM) 510 and random access memory (RAM) 515 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 530 may permit information from the bus 500 to be displayed on the display 535 in audio, visual, graphic or alphanumeric format. Communication with external devices, such as a printing device, may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of processing a specification, the method comprising:
   receiving, by a first destination marketplace, a specification from a home site, wherein the specification defines a product or service and comprises:
      a command block comprising one or more instructions for performing a search and one or more search criteria and one or more instructions for performing one or more actions based on a result of the search,
      an origin block comprising an identifier associated with the home site, and
      a routing block comprising information associated with one or more marketplaces that have already processed the specification and one or more instructions for forwarding the specification to one or more other marketplaces that have not yet processed the specification;
   authenticating, by the first destination marketplace, the specification by:
      identifying a digital signature embedded in the specification,
      identifying a verification uniform resource locator embedded in the specification, and
      transmitting the digital signature to a website corresponding to the verification uniform resource locator;
   in response to receiving verification of authenticity from the website, processing, by the first destination marketplace, the specification by executing one or more of the instructions in the command block;
   creating, by the first destination marketplace, an updated specification by modifying the specification to include an indication of which instructions were executed by the first destination marketplace; and
   performing, by the first destination marketplace, one or more of the actions.

2. The method of claim 1, wherein processing the specification comprises:
   searching a database associated with the first destination marketplace to identify a list of search results comprising indications of at least one good or service that satisfies the search criteria; and transmitting the list of search results according to one or more instructions in the command block of the specification.

3. The method of claim 1, wherein modifying the specification comprises updating the routing block to include a uniform resource locator associated with the first destination marketplace.

4. The method of claim 1, wherein modifying the specification comprises updating the routing block to include a timestamp indicating when the first destination marketplace processed the specification.

5. The method of claim 1, wherein modifying the specification comprises updating the routing block to include an indication of whether the first destination marketplace authorized the specification.

6. The method of claim 1, wherein modifying the specification comprises updating the routing block by incrementing a number of times that the specification has been transmitted.

7. The method of claim 1, wherein creating an updated specification comprises:
   identifying a second destination marketplace from a database associated with the first destination marketplace; and
   updating the routing block to include a uniform resource locator associated with the second destination marketplace.

8. The method of claim 1, further comprising:
   identifying a universal unique identifier associated with the specification; and
   in response to the first destination marketplace not previously receiving a second specification associated with the universal unique identifier, processing the specification.

9. The method of claim 1, wherein performing one or more actions comprises:
   in response to a transmission number equaling or exceeding a permitted transmission number, not transmitting the specification by the first destination marketplace to a second destination marketplace; and
   in response to the permitted transmission number exceeding the transmission number, transmitting the specification by the first destination marketplace to a second destination marketplace,
   wherein the transmission number indicates a number of times the specification has been transmitted,
   wherein the permitted transmission number indicates a number of times the specification is allowed to be transmitted,
   wherein the specification comprises the transmission number and the permitted transmission number.

10. The method of claim 1, wherein performing one or more of the actions comprises performing one or more of the following:
    refining the results of the search;
    placing a bid on the at least one good or service;
    purchasing the at least one good or service; and
    emailing the results to a user.

11. A method of processing a specification, the method comprising:
    receiving, by a first destination marketplace, a specification from a home site, wherein the specification defines a product or service and comprises:
      a command block comprising one or more instructions for performing a search, one or more search criteria, a marketplace type, and one or more instructions for performing one or more actions based on a result of the search,
      an origin block comprising an identifier associated with the home site, and
      a routing block comprising information associated with one or more marketplaces that have already processed the specification and one or more instructions for forwarding the specification to one or more other marketplaces that have not yet processed the specification;
    authenticating, by the first destination marketplace, the specification by:,
      identifying a digital signature embedded in the specification,
      identifying a verification uniform resource locator embedded in the specification, and
      transmitting the digital signature to a website corresponding to the verification uniform resource locator;
    in response to receiving verification of authenticity from the website, determining whether the first destination marketplace satisfies the marketplace type;
    in response to the first destination marketplace satisfying the marketplace type, processing, by the first destination marketplace, the specification by executing one or more of the instructions in the command block;
    creating, by the first destination marketplace, an updated specification by modifying the specification to include an indication of which instructions were executed by the first destination marketplace;
    identifying a transmission number embedded in the specification,
    wherein the transmission number indicates a number of times the specification has been transmitted;
    incrementing the transmission number;
    modifying the specification by replacing the identified transmission number with the incremented transmission number; and
    in response to a permitted transmission number exceeding the incremented transmission number, transmitting, by the first destination marketplace, the specification to a second destination marketplace, wherein the permitted transmission number indicates a number of times the specification is allowed to be transmitted.

12. A system for processing a specification, the system comprising:
    a computing device associated with a first marketplace destination;
    a computer-readable storage medium in communication with the computing device, wherein the computer-readable storage medium comprises one or more programming instructions that, when executed, cause the computing device to perform the following:
      receiving a specification from a home site, wherein the specification defines a product or service and comprises:
        a command block comprising one or more instructions for performing a search and one or more search criteria and one or more instructions for performing one or more actions based on a result of the search,
        an origin block comprising an identifier associated with the home site, and
        a routing block comprising information associated with one or more marketplaces that have already processed the specification and one or more instructions for forwarding the specification to one or more marketplaces that have not yet processed the specification, authenticating the specification by:
- identifying a digital signature embedded in the specification,
- identifying a verification uniform resource locator embedded in the specification, and
- transmitting digital signature to a website corresponding the verification uniform resource locator, in response to receiving verification of authenticity from the website, processing the specification by executing one or more of the instructions in the command block, creating an updated specification by modifying the specification to include an indication of which instructions were executed by the first destination marketplace, and performing one or more actions.

13. The system of claim 12, wherein the one or more processing instructions for processing the specification comprise one or more processing instructions that, when executed, cause the computing device to perform the following:
- search a database associated to identify a list of search results comprising indications of at least one good or service that satisfies the search criteria; and
- transmitting the list of search results according to one or more instructions in the command block of the specification.

14. The system of claim 12, wherein the one or more programming instructions for modifying the specification comprise one or more programming instructions for updating the routing block to include a uniform resource locator associated with the first destination marketplace.

15. The system of claim 12, wherein the one or more programming instructions for modifying the specification comprise one or more programming instructions for updating the routing block to include a timestamp indicating when the first destination marketplace processed the specification.

16. The system of claim 12, wherein the one or more programming instructions for modifying the specification comprise one or more programming instructions for updating the routing block to include an indication of whether the first destination marketplace authorized the specification.

17. The system of claim 12, wherein the one or more programming instructions for creating an updated specification comprise one or more programming instructions for:
- identifying an associated destination marketplace from a database associated with the first destination marketplace; and
- updating the routing block to include a uniform resource locator corresponding to the associated destination marketplace.

18. The system of claim 12, wherein the one or more programming instructions for processing the specification comprise one or more programming instructions for:
- identifying a marketplace type from the specification;
- in response to the first destination marketplace satisfying the marketplace type, processing the specification by the first destination marketplace; and
- the one or more programming instructions for creating an updated specification comprise one or more programming instructions for updating the routing block to include a uniform resource locator associated with the first destination marketplace.

* * * * *